US012337667B2

(12) United States Patent
Minichiello, Jr.

(10) Patent No.: US 12,337,667 B2
(45) Date of Patent: Jun. 24, 2025

(54) COVER APPARATUS FOR A FLATBED TRAILER

(71) Applicant: Paul Minichiello, Jr., Reno, NV (US)

(72) Inventor: Paul Minichiello, Jr., Reno, NV (US)

( * ) Notice: Subject to any disclaimer, the term of this patent is extended or adjusted under 35 U.S.C. 154(b) by 227 days.

(21) Appl. No.: 18/195,238

(22) Filed: May 9, 2023

(65) Prior Publication Data

US 2024/0375494 A1 Nov. 14, 2024

(51) Int. Cl.
*B60J 7/10* (2006.01)

(52) U.S. Cl.
CPC ..................... *B60J 7/102* (2013.01)

(58) Field of Classification Search
None
See application file for complete search history.

(56) References Cited

U.S. PATENT DOCUMENTS

| | | | | |
|---|---|---|---|---|
| 2,565,746 A * | 8/1951 | Turner | | B60J 7/102 135/137 |
| 2,826,210 A | 3/1958 | Heil | | |
| 3,521,927 A | 7/1970 | Barry | | |
| 4,657,299 A * | 4/1987 | Mahan | | E04H 15/40 135/88.13 |
| 4,750,509 A * | 6/1988 | Kim | | E04H 15/48 135/30 |
| 4,968,085 A | 11/1990 | Stann | | |
| 6,447,038 B1 | 9/2002 | Davis | | |
| 6,499,783 B1 * | 12/2002 | Husted | | B60P 3/04 296/35.3 |
| 6,964,447 B2 * | 11/2005 | McNamee | | B60J 11/00 150/166 |
| 7,021,694 B1 * | 4/2006 | Roberts | | B60P 3/341 5/118 |
| 8,448,656 B2 * | 5/2013 | Choi | | E04H 15/42 135/147 |
| 8,454,076 B2 * | 6/2013 | Bourcier | | B60J 7/102 296/105 |
| 8,496,019 B2 * | 7/2013 | Zhou | | E04H 15/48 135/147 |
| 8,789,548 B2 * | 7/2014 | Atherton | | A01M 31/025 135/88.13 |
| 9,481,404 B1 | 11/2016 | Rich | | |

FOREIGN PATENT DOCUMENTS

CA 2349049 11/2002

* cited by examiner

*Primary Examiner* — Joseph D. Pape

(57) ABSTRACT

A cover apparatus for covering a flatbed trailer includes a frame comprising a hub and a plurality of support members. The plurality of support members is coupled to the hub. Each support member of the plurality of support members comprises a beam and a mounting bracket. The beam of each support member of the plurality of support members is coupled to the hub and extends outwardly and downwardly therefrom. The mounting bracket of each support member of the plurality of support members is coupled to a distal end of the beam with respect to the hub and is configured for mounting the frame to a platform of the flatbed trailer. A sheet is removably coupled to the frame and is positioned over and around the frame, bounding an interior space.

9 Claims, 7 Drawing Sheets

COVER APPARATUS FOR A FLATBED TRAILER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to cover apparatuses and more particularly pertains to a new cover apparatus for covering a flatbed trailer.

(2) Description of Related Art Including Information Disclosed Under 37 CFR 1.97 and 1.98

The prior art discloses myriad cover apparatuses for covering a trailer or a truck bed. However, the prior art fails to describe such a cover apparatus which comprises a frame made of a hub, a plurality of outwardly extending beams, a plurality of mounting members for removably mounting the frame to a platform of a flatbed trailer, and a sheet to attach to the frame. Such an apparatus is desirable, because the apparatus may be assembled and disassembled easily in an alternative way to the apparatuses of the prior art.

BRIEF SUMMARY OF THE INVENTION

An embodiment of the disclosure meets the needs presented above by generally comprising a frame comprising a hub and a plurality of support members. The plurality of support members is coupled to the hub. Each support member of the plurality of support members comprises a beam and a mounting bracket. The beam of each support member of the plurality of support members is coupled to the hub and extends outwardly and downwardly therefrom. The mounting bracket of each support member of the plurality of support members is coupled to a distal end of the beam with respect to the hub and is configured for mounting the frame to a platform of a flatbed trailer. A sheet is removably coupled to the frame and is positioned over and around the frame, bounding an interior space.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
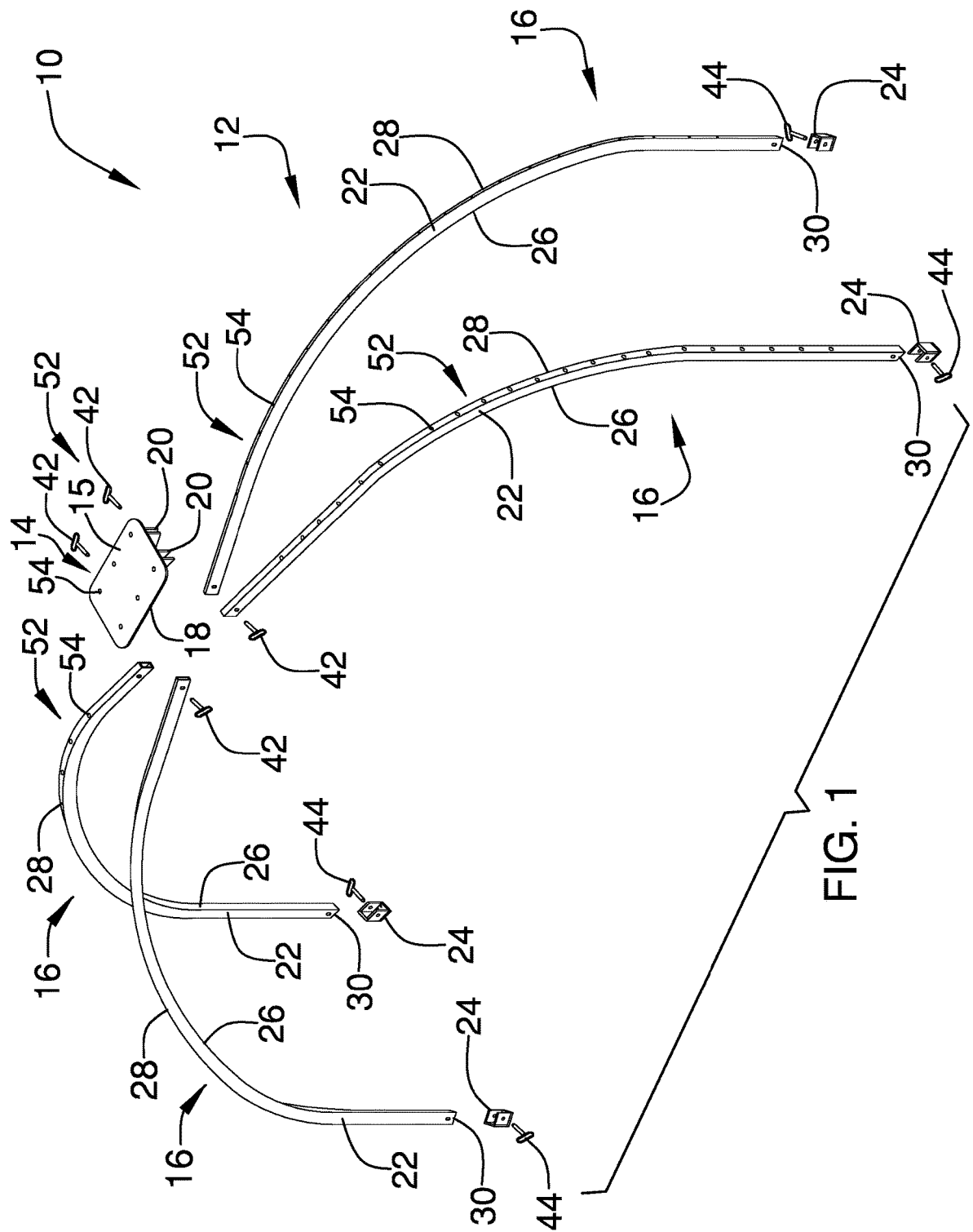
FIG. 1 is an exploded perspective view of a frame of a cover apparatus according to an embodiment of the disclosure.
Figure 2:
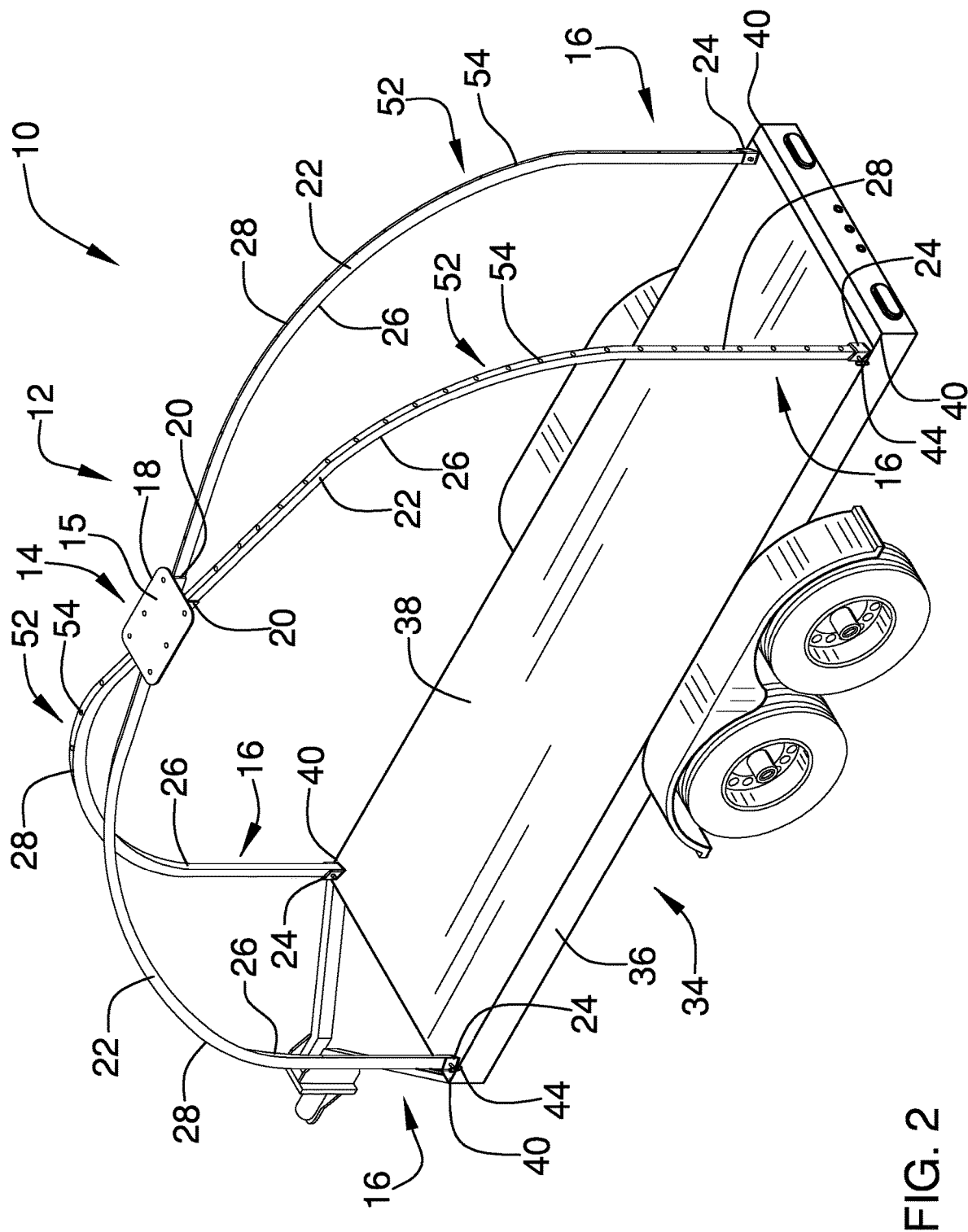
FIG. 2 is a perspective in-use view of the frame of an embodiment of the disclosure.
Figure 3:
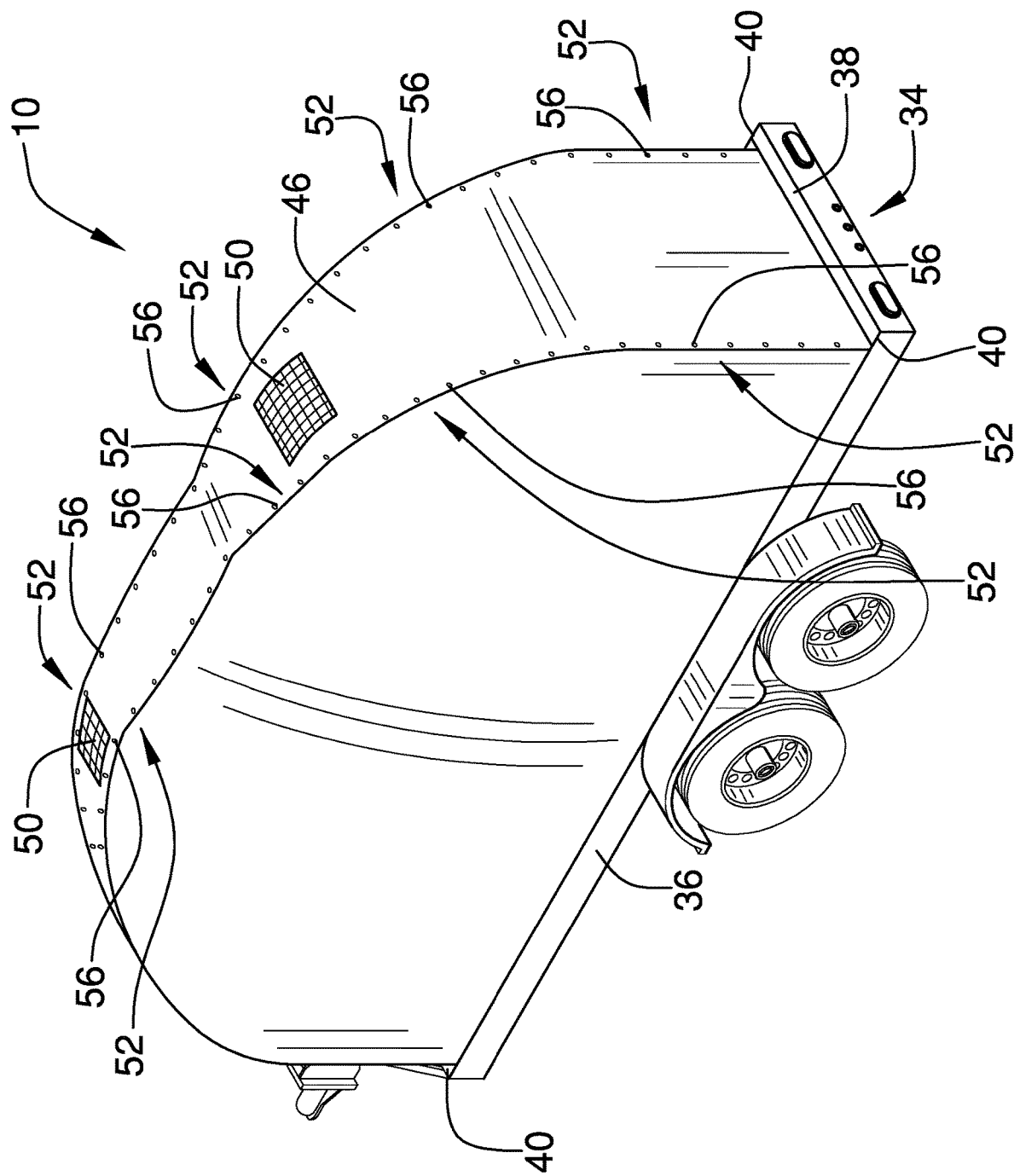
FIG. 3 is a perspective in-use view of an embodiment of the disclosure.
Figure 4:
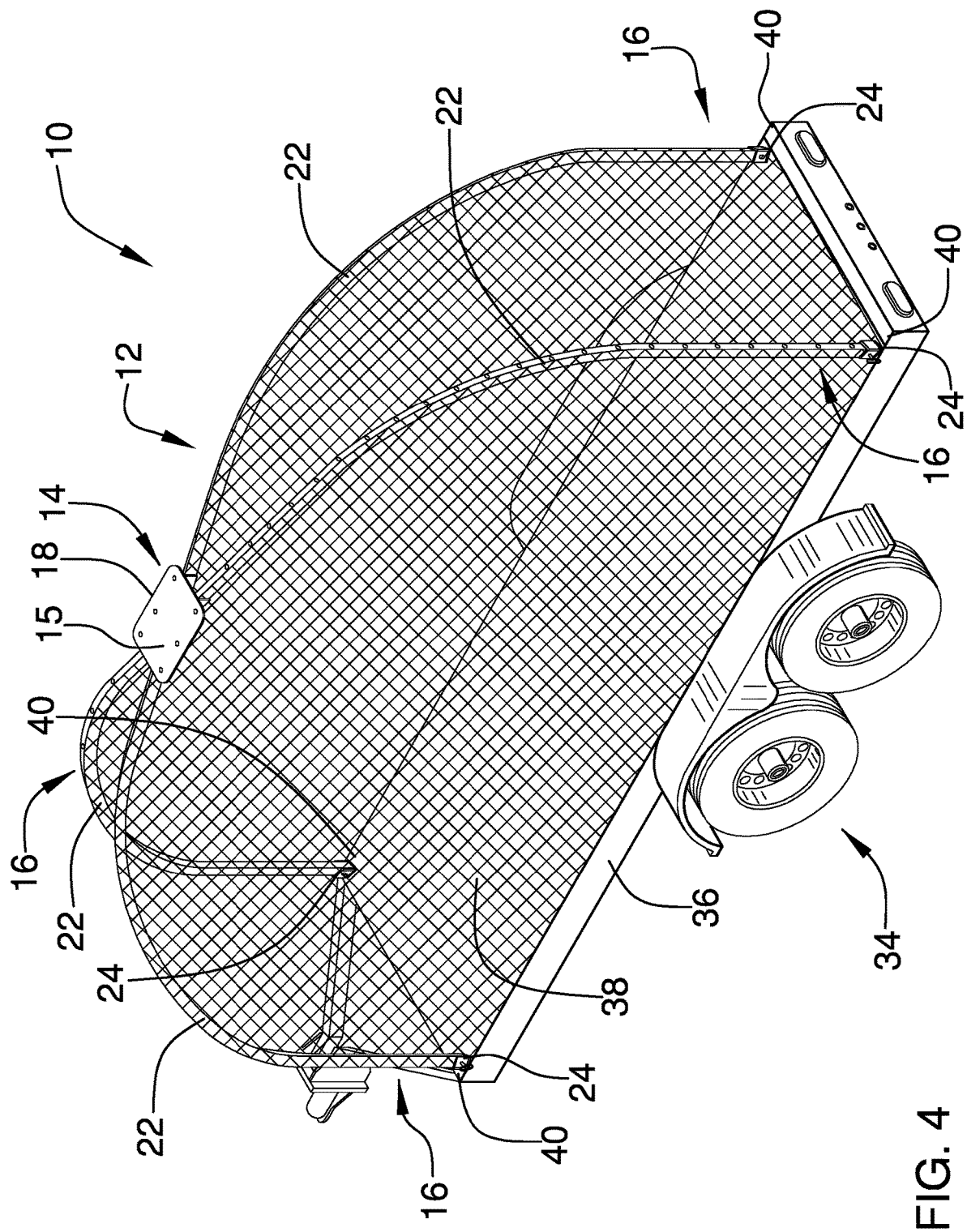
FIG. 4 is a perspective in-use view of an embodiment of the disclosure.
Figure 5:
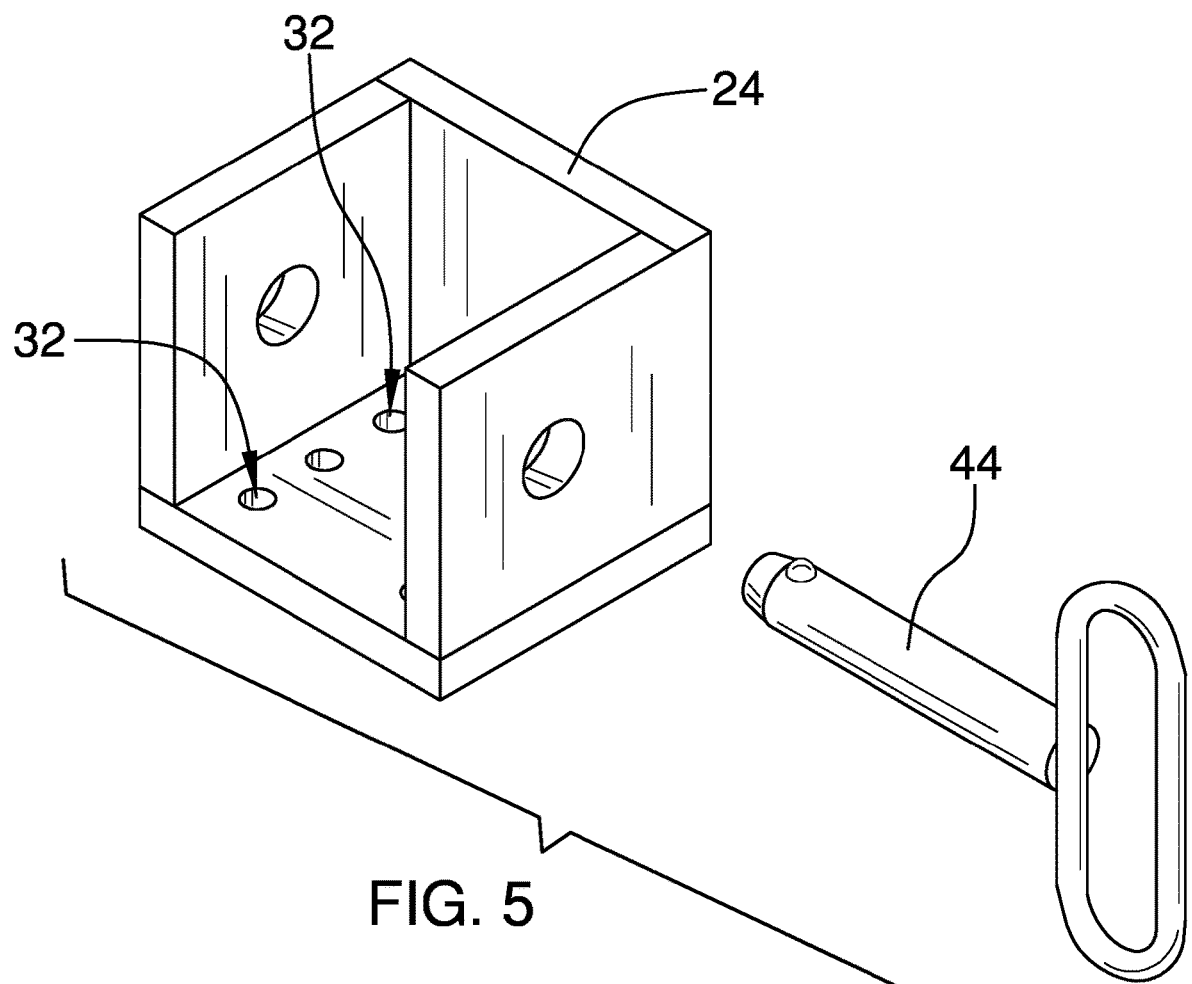
FIG. 5 is a detail perspective view of a mounting bracket of an embodiment of the disclosure.
Figure 6:
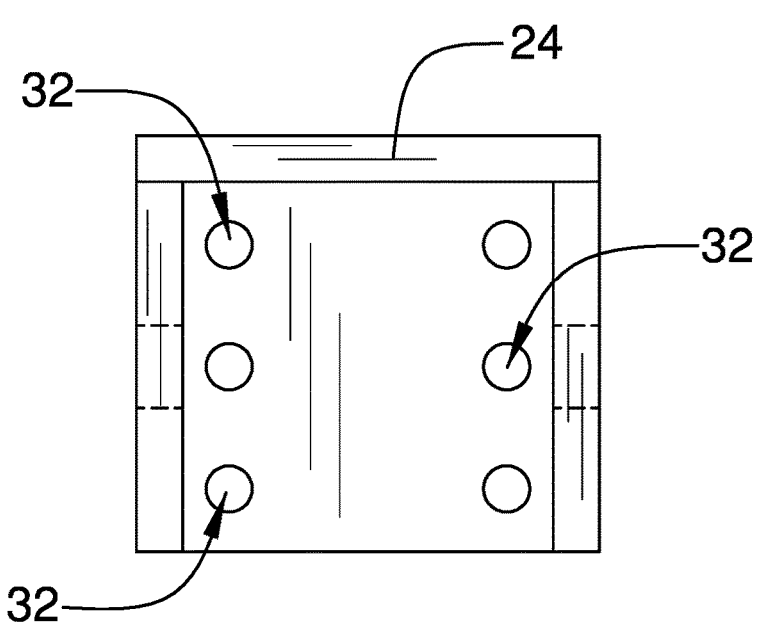
FIG. 6 is a detail top view of the mounting bracket of an embodiment of the disclosure.
Figure 7:
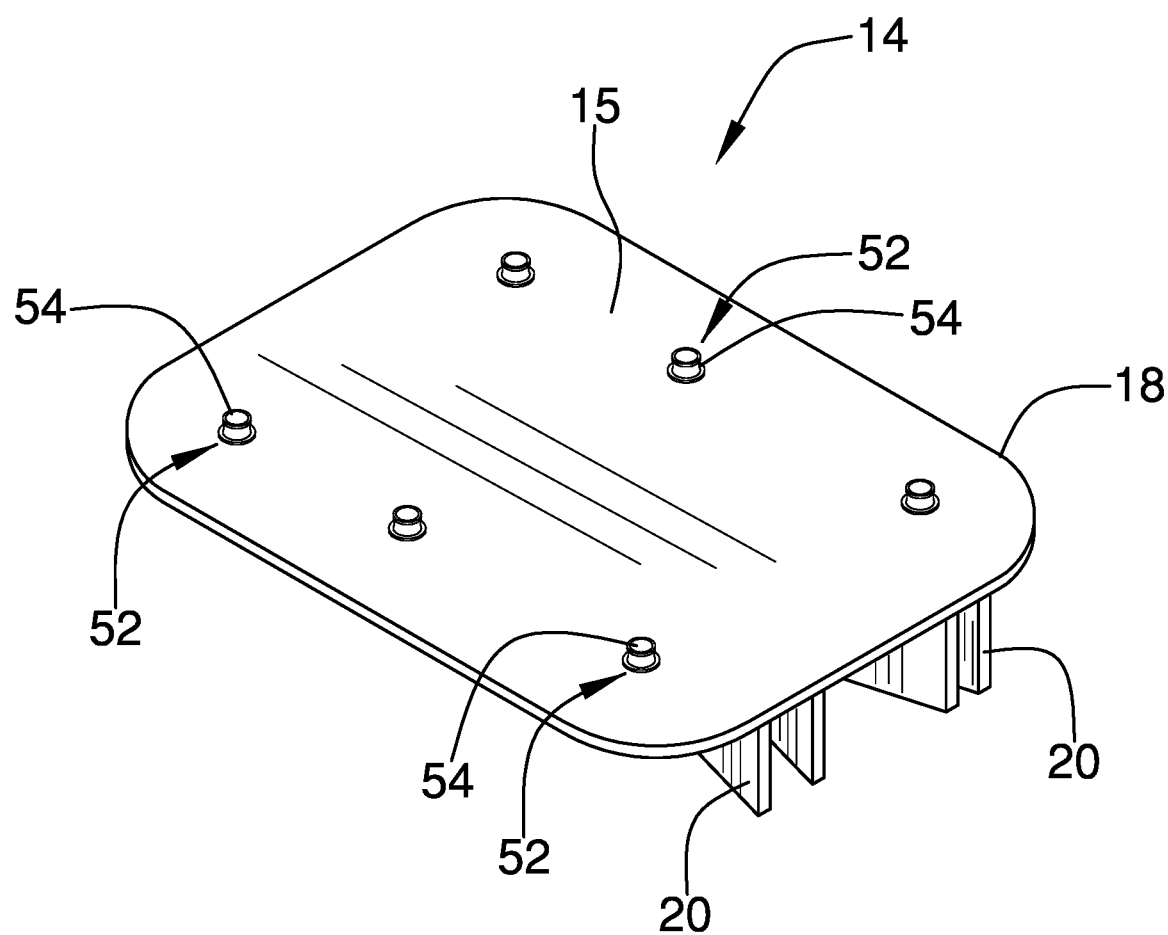
FIG. 7 is a detail top perspective view of a hub of an embodiment of the disclosure.
Figure 8:
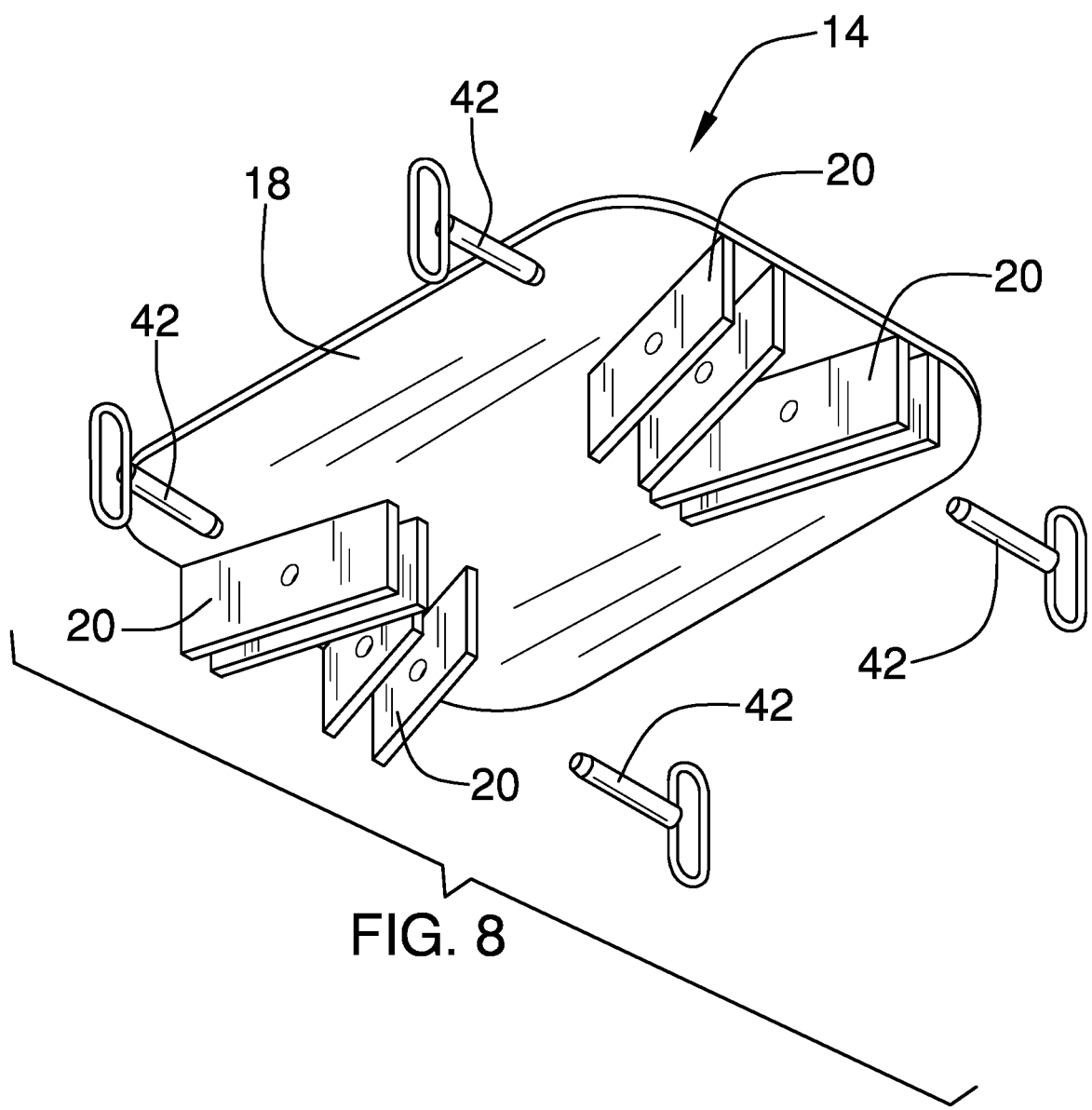
FIG. 8 is a detail bottom perspective view of the hub of an embodiment of the disclosure.

With reference now to the drawings, and in particular to FIGS. 1 through 8 thereof, a new cover apparatus embodying the principles and concepts of an embodiment of the disclosure and generally designated by the reference numeral 10 will be described.

As best illustrated in FIGS. 1 through 8, the cover apparatus 10 generally comprises a frame 12 comprising a hub 14 and a plurality of support members 16 being coupled to each other. The hub 14 comprises a top panel 18 and a plurality of connector panels 20, wherein the plurality of connector panels 20 is coupled to and extends downwardly from the top panel 18.

Each support member 16 of the plurality of support members 16 comprises a beam 22, a mounting bracket 24, a hub locking pin 42, and a bracket locking pin 44. The beam 22 is coupled to at least one associated connector panel 20 of the plurality of connector panels 20 of the hub 14 and extends outwardly and downwardly from the hub 14. An inner side 26 of the beam 22 is concave. The mounting bracket 24 is coupled to a distal end 30 of the beam 22 with respect to the hub 14. The mounting bracket 24 has at least one mounting hole 32 which extends downwardly through the mounting bracket 24 and is configured for facilitating mounting the frame 12 to a platform 36 of a flatbed trailer 34 by receiving a fastener. The mounting bracket 24 also may removably couple to the platform 36 of the flatbed trailer 34 via a latch, a clasp, a clamp, or the like. All the mounting brackets 24 of the frame 12 are positioned with respect to each other such that each mounting bracket 24 is configured to be positioned adjacent to one of a plurality of corners 40 of an upper surface 38 of the platform 36.

A hub locking pin 42 extends through the beam 22 and the at least one associated connector 52 panel 20 to releasably couple the beam 22 to the hub 14, and a bracket locking pin 44 extends through the beam 22 and the mounting bracket 24 to releasably couple the beam 22 to the mounting bracket 24. The hub 14 and bracket locking pins 44 allow for disassembly of the frame 12. Other releasable fasteners may be used instead of locking pins to attach the hub 14 to the beam 22 of each support member 16 of the plurality of support members 16 and to attach the beam 22 of each support member 16 of the plurality of support members 16 to an associated one of the plurality of mounting brackets 24. For example, latches, clasps, clamps, or the like may be used.

A sheet 46 is removably coupled to the frame 12 and is positioned over and around the frame 12, bounding an interior space 48. At least a pair of spaced portions 50 of the sheet 46 is air permeable to facilitate ventilation of the interior space 48. In some embodiments, an entirety of the sheet 46 is air permeable. The sheet 46 or at least the pair of spaced portions 50 thereof may comprise a mesh fabric which forms a plurality of apertures such that the sheet 46 is air permeable. The sheet 46 may be at least partially constructed of an opaque material such that the interior space 48 is not viewable through the sheet 46 entirely or at least from a distance away from the sheet 46.

A plurality of connectors 52 is coupled to the sheet 46 and the frame 12 to removably couple the sheet 46 to the frame 12. Each connector 52 of the plurality of connectors 52 comprises a first mating member 54 and a second mating member 56. The first mating members 54 of the plurality of connectors 52 are arranged across a top 15 of the hub 14 and along an outer side 28 of the beam 22 of each support member 16 of said plurality of support members 16, and the second mating members 56 are coupled to an inner surface of the sheet 46. Each connector 52 of the plurality of connectors 52 comprises a snap button but may comprise a hook-and-loop fastener, a zipper, a strap, or the like.

In use, the frame 12 is assembled and attached to the platform 36 and the sheet 46 is attached to the frame 12 to bound the interior space 48, which is positioned above the platform 36. The cover apparatus 10 protects objects positioned within the interior space 48 from external elements.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cover apparatus for a flatbed trailer, the apparatus comprising:
   a frame comprising:
      a hub;
      a plurality of support members being coupled to the hub, each support member of the plurality of support members comprising:
         a beam being coupled to the hub and extending outwardly and downwardly therefrom; and
         a mounting bracket being coupled to a distal end of the beam with respect to the hub, the mounting bracket being configured for mounting the frame to a platform of the flatbed trailer;
   a sheet being removably coupled to the frame, the sheet being positioned over and around the frame, the sheet bounding an interior space;
   a plurality of connectors being coupled to the sheet and the frame to removably couple the sheet to the frame, wherein each connector of the plurality of connectors comprises a first mating member and a second mating member,
      the first mating members of the plurality of connectors being arranged across a top of the hub and along an outer side of the beam of each support member of said plurality of support members, the second mating members being coupled to an inner surface of the sheet.

2. The apparatus of claim 1, wherein:
   the hub comprises a top panel and a plurality of connector panels, the plurality of connector panels being coupled to and extending downwardly from the top panel;
   the beam of each support member of the plurality of support members being coupled to at least one associated connector panel of the plurality of connector panels.

3. The apparatus of claim 1, wherein an inner side of the beam of each support member of the plurality of support members is concave.

4. The apparatus of claim 1, wherein the mounting bracket of each support member of the plurality of support members has at least one mounting hole extending downwardly through the mounting bracket, the at least one mounting hole being configured for facilitating mounting the frame to the platform of the flatbed trailer by receiving a fastener.

5. The apparatus of claim 1, wherein each support member of the plurality of support members further comprises a hub locking pin extending through the beam and the at least one associated connector panel to releasably couple the beam to the hub.

6. The apparatus of claim 1, wherein each support member of the plurality of support members further comprises a bracket locking pin extending through the beam and the mounting bracket to releasably couple the beam to the mounting bracket.

7. The apparatus of claim 1, wherein the mounting brackets of the frame are positioned with respect to each other such that each mounting bracket is configured to be positioned adjacent to one of a plurality of corners of an upper surface of the platform.

8. The apparatus of claim 1, wherein at least a pair of spaced portions of the sheet being air permeable to facilitate ventilation of the interior space.

9. A cover apparatus for a flatbed trailer, the apparatus comprising:

a frame comprising:
- a hub, the hub comprising a top panel and a plurality of connector panels,
  - the plurality of connector panels being coupled to and extending downwardly from the top panel;
- a plurality of support members being coupled to the hub, each support member of the plurality of support members comprising:
  - a beam extending outwardly and downwardly from the hub, an inner side of the beam being concave, the beam being coupled to at least one associated connector panel of the plurality of connector panels;
  - a mounting bracket being coupled to a distal end of the beam with respect to the hub, the mounting bracket having at least one mounting hole extending downwardly through the mounting bracket, the at least one mounting hole being configured for facilitating mounting the frame to a platform of the flatbed trailer by receiving a fastener;
  - a hub locking pin extending through the beam and the at least one associated connector panel to releasably couple the beam to the hub; and
  - a bracket locking pin extending through the beam and the mounting bracket to releasably couple the beam to the mounting bracket; and
  - the mounting brackets of the frame being positioned with respect to each other such that each mounting bracket is configured to be positioned adjacent to one of a plurality of corners of an upper surface of the platform;
- a sheet being removably coupled to the frame, the sheet being positioned over and around the frame, the sheet bounding an interior space, at least a pair of spaced portions of the sheet being air permeable to facilitate ventilation of the interior space; and
- a plurality of connectors being coupled to the sheet and the frame to removably couple the sheet to the frame, each connector of the plurality of connectors comprising a first mating member and a second mating member, the first mating members of the plurality of connectors being arranged across a top of the hub and along an outer side of the beam of each support member of said plurality of support members, the second mating members being coupled to an inner surface of the sheet, each connector of the plurality of connectors comprising a snap button.

* * * * *